Patented Jan. 20, 1953

2,626,283

UNITED STATES PATENT OFFICE 2,626,283

PREPARATION OF ACROLEIN ACETAL

Richard R. Whetstone, Orinda, Calif., assignor to Shell Development Company, San Francisco, Calif., a corporation of Delaware No Drawing. Application August 28, 1950, Serial No. 181,909

2 Claims. (Cl. 260—615)

This invention relates to a method for the preparation of acetals of unsaturated aldehydes and it more particularly relates to a process for the direct preparation of acetals of acrolein from the acrolein and the alcohol.

The methods heretofore known for the production of acetals of acrolein have, in the main, involved an indirect procedure requiring, for example, the preparation of an acetal of a halogen-substituted propionaldehyde and dehydrohalogenation of this intermediate acetal to obtain the desired acrolein acetal. The necessity for such an indirect procedure has resulted primarily from the formation of beta-alkoxy aldehydes and beta-alkoxy aldehyde acetals rather than of acetals of acrolein in the previously known methods for reacting acrolein with alcohols. In fact, such beta-alkoxy aldehydes and acetals thereof have been, insofar as I am aware, the only products heretofore obtained by reacting acrolein with an alcohol.

The reaction between acrolein and an alcohol to produce beta-alkoxy aldehydes and beta-alkoxy aldehyde acetals has been carried out heretofore with the aid of various acidic catalysts, particularly strong mineral acids. U. S. Patent 2,288,211, to Schulz, discloses such a process whereby acrolein and alcohols are reacted in the presence of various acidic catalysts to produce beta-alkoxy aldehydes and the corresponding beta-alkoxy dialkyl acetals.

It has now been discovered in accordance with the present invention that the reaction of acrolein with alcohols, when carried out in the presence of a particular class of solid catalysts, hereinafter more fully disclosed, proceeds to the formation not of beta-alkoxy aldehydes or acetals thereof, as in the prior art processes, but, instead, to the formation of the acetal of acrolein and the alcohol as the only significant product of the reaction. As in the prior art processes, the reaction upon which the present invention is based occurs in the liquid phase simply upon contacting under suitable conditions acrolein, the alcohol, and the selected catalyst. The desired acrolein acetal is recoverable by removing the catalyst from the mixture and, for example, fractionally distilling the mixture. Insofar as is known, the present invention provides the first instance in which an acetal of acrolein has been obtained as the major product directly from the reaction of an alcohol and acrolein.

The particular class of catalysts that is used in accordance with the invention comprises the difficultly reducible refractory oxides. These catalysts, which are essentially insoluble in the reaction mixture comprising the acrolein and the alcohol, include, without being limited to, the oxides of aluminum, silicon, zirconium, titanium, cerium, thorium, and hafnium, and combinations or mixtures thereof, the preferred catalysts comprising at least one member of the class consisting of silica and alumina. A particularly preferred type of catalyst suited to the objects of the invention is a gel-type, highly porous catalyst having a high surface area per unit weight, e. g., about 100 or more square meters per gram. In composition, the preferred catalysts consist essentially of a major portion, preferably above about 70% by weight, of a precipitated silica hydrogel and minor portions of a precipitated refractory oxide hydrogel. Such catalyst masses, which consist essentially of silica-alumina, silica-ceria, silica-zirconia, silica-alumina-zirconia, silica-titania, silica-thoria, silica-alumina-thoria, and like gels, are generally prepared by precipitating solutions containing aluminum, zirconium, titanium, cerium, or thorium, or mixtures thereof on a precipitated silica hydrogel, and washing and calcining. Because of the sensitivity of acrolein to strong alkalies, the catalysts preferably are free of alkali metal oxides. In referring to the catalysts as consisting essentially of "silica-alumina, silica-zirconia, silica-alumina-zirconia, etc." it is not intended to imply that the catalysts are composed of the recited materials in uncombined form, since not in all cases has the structure of such solid masses been elucidated. It can be definitely stated that such catalysts contain one or more of silicon, aluminum, zirconium, etc., as the case may be, and oxygen, in combined form, the precise manner of combination not yet having been established.

Catalyst masses of the type that are employed in accordance with the process of the invention are well-known to those skilled in the art and have been employed, for example, in the catalytic cracking of petroleum fractions or products derived from petroleum, as dehydration catalysts, and as hydrogenation-dehydrogenation catalysts applicable to various organic conversions effected in the vapor phase. Disclosures of processes suitable for the preparation of representative catalysts that may be used in accordance with the present invention are as follows: U. S. 2,146,718, to Bond; U. S. 2,285,314, to Thomas and Ahlberg; U. S. 2,287,917, to Thomas and Danforth; U. S. 2,328,754, to Thomas; U. S. 2,328,756, to Thomas; U. S. 2,382,951, to Ahlberg and Thomas; U. S. 2,433,869, to Shabaker; U. S. 2,478,519, to Ashley and Jaeger; U. S. 2,469,314, to Ryland and Tamele; Thomas, J. Am. Chem. Soc. 66, 1586 (1944).

The catalyst that is used in the process of the present invention may be applied in the form of pelleted masses, in pulverulent form, in extruded shapes, or as small spheroids, e. g., ranging in size up to 100 mesh or larger. The particular physical form of the catalyst is not critical, it only being necessary that the catalyst be in a form convenient to handle and apply in accordance with the operations involved.

The reaction between the acrolein and the alcohol to produce the corresponding acrolein acetal may be carried out simply by bringing the acrolein and the alcohol into reactive contact in liquid phase in the presence of the solid catalyst comprising a difficultly reducible refractory oxide. The acrolein and the alcohol conveniently may be employed in substantially equimolecular proportions. Amounts of the alcohol greater than about 2 moles per mole of acrolein can be used, although less desirably so because of the possibility of undesired side reactions. Smaller amounts of the alcohol, say below about 0.5 mole per mole of acrolein, can be used, although again less desirably so because of reduced over-all efficiency. In general, the acrolein and the alcohol are employed in molar proportions ranging from about 5:1 to about 1:5, a preferred range being from about 2:1 to about 1:3.

Only small amounts of the solid catalyst are required. Although larger amounts may be used, it is ordinarily not necessary to use more than about 25% by weight of the catalyst based upon the weight of the reactants. The amount of the catalyst preferably is within the range of from about 0.5% to about 10% by weight of the reactants.

The reaction temperature preferably is maintained within the range of from about 0° C. to about 50° C. Somewhat higher temperatures may at times be suitable, although ordinarily the selectivity of the reaction decreases as the temperature is elevated, making preferable the use of the lowest temperatures consistent with an adequate rate of reaction. Because of their convenience and effectiveness, ordinary room temperatures, e. g., about 15° C. to about 30° C., are particularly suitable.

The reaction time may be varied according to the particular reactants that are involved, the catalyst and the amount thereof, and like considerations. The reaction, which ultimately results in the formation of an equilibrium condition in the reaction mixture, may be followed conveniently by taking aliquots of the reaction mixture and analyzing such aliquots for the desired unsaturated aldehyde acetal, or by determining the change in the refractive index of the reaction mixture. As the reaction progresses the concentration of the acrolein acetal in the reaction mixture increases and the refractive index of the mixture changes, and as the reaction approaches equilibrium the concentration of the acetal in the reaction mixture approaches a constant value, as does the refractive index of the mixture. The reaction may be carried to equilibrium, or if desired, it may be interrupted at any suitable previous time for recovery of the desired product.

The reaction between the acrolein and the alcohol can be carried out either batchwise or in a continuous manner. In batchwise operation the acrolein and the alcohol may be mixed in suitable proportions and contacted with the solid catalyst, preferably with agitation to insure thorough contact between the liquid mixture and the solid catalyst. In continuous operations the mixture may be passed through a bed of the catalyst in an elongated tube or other suitable reaction zone, the rate of flow of the mixture being so correlated with the dimensions of the apparatus to provide adequate contact time.

The acrolein acetal formed by the reaction may be recovered simply by separating the liquid reaction mixture from the solid catalyst, e. g., by filtration, and fractionally distilling the liquid mixture. It is desirable to insure substantially complete separation of the catalyst from the mixture prior to distillation because at the elevated temperatures likely to be employed in the distillation undesired side reactions tend to occur if traces of the catalyst are present in the distilland. Although the foregoing represents a generally suitable method of recovery, it will be understood that the invention is not intended to be limited thereto. For example, in some cases, depending upon the intended use of the acrolein acetal, it may not be necessary to recover it in the pure state from the reaction mixture, while in other cases it may be desired to obtain it in the form of a derivative which may be formed in situ. Unreacted acrolein and unreacted alcohol may be recovered from the reaction mixture, separately or together, and recycled.

The acrolein acetals that are attainable according to the present invention are of particular interest as biologically active compounds and as technical intermediates for the synthesis of other organic compounds.

The following example will illustrate certain of the numerous specific embodiments of the invention. It will be appreciated that the example is presented with the intent to illustrate the invention and not to limit the invention as it is defined by the hereto-appended claims.

Example

To an equimolar mixture of acrolein and ethanol there is added 1.5% by weight of a silica-alumina-zirconia gel-type catalyst (approximate composition 82% silica, 4% alumina, and 9% zirconia) prepared by precipitating a silica hydrogel and adding thereto precipitated zirconia and alumina hydrogels in the manner described by Thomas, J. Am. Chem. Soc., 66 1586 (1944). The reaction mixture is allowed to stand with occasional agitation until equilibrium is substantially attained, as judged by the refractive index of the mixture. The catalyst then is removed by careful filtration and the filtrate is fractionally distilled. Acrolein diethyl acetal is separated as the fraction distilling between 43.5° C. and 45.5° C. under 40 millimeters mercury pressure in a yield corresponding to 77%, based upon the amount of ethanol consumed.

Although in the foregoing example the method of the invention was illustrated by the reaction of acrolein with ethanol to produce acrolein diethyl acetal, it will be distinctly understood that instead of ethanol there can be employed other monohydric alcohols, preferably lower aliphatic monohydric alcohols, such as methyl alcohol, isopropyl alcohol, butyl alcohol, octyl alcohol, allyl alcohol, and methyl isobutyl carbinol. Representative specific conversions that may be carried out in the above-described manner include, for example, the reaction of acrolein with isopropyl alcohol to form acrolein diisopropyl acetal, the reaction of acrolein with methyl alcohol to produce acrolein dimethyl acetal, and the reaction of acrolein with allyl alcohol to produce acrolein diallyl acetal.

I claim as my invention:

1. In the production of an acetal of acrolein, contacting a liquid mixture of acrolein and an alcohol at a temperature between about 0° C. and about 50° C. with porous solid calcined silica-alumina hydrogel, having a surface area not less than about 100 square meters per gram, until the acetal of acrolein and the alcohol is formed, and recovering said acetal from the reaction mixture.

2. In the production of acrolein diethyl acetal, contacting a liquid mixture of acrolein and an about equimolar amount of ethanol based on the amount of acrolein with a porous solid calcined precipitated silica-alumina-zirconia hydrogel at a temperature of from about 15° C. to about 30° C. until said acrolein diethyl acetal is formed, and recovering the acrolein diethyl acetal from the reaction mixture.

RICHARD R. WHETSTONE.

REFERENCES CITED

The following references are of record in the file of this patent:

UNITED STATES PATENTS

| Number | Name | Date |
|---|---|---|
| 2,280,649 | Kanhofer | Apr. 21, 1942 |
| 2,451,949 | Heinemann | Oct. 19, 1948 |
| 2,501,144 | Saunders | Mar. 21, 1950 |

FOREIGN PATENTS

| Number | Country | Date |
|---|---|---|
| 404,256 | Germany | Oct. 13, 1924 |
| 553,177 | Germany | June 22, 1932 |

OTHER REFERENCES

Pingert: Organic Synthesis, vol. 25, pp. 1–4 (1945), John Wiley and Sons, New York.